(12) United States Patent
Simcik

(10) Patent No.: US 10,231,167 B2
(45) Date of Patent: Mar. 12, 2019

(54) BUILDING ACCESS ZONE SPECIFICATION FOR MOBILE APPLICATIONS

(71) Applicant: Otis Elevator Company, Farmington, CT (US)

(72) Inventor: Paul A. Simcik, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/638,502

(22) Filed: Jun. 30, 2017

(65) Prior Publication Data

US 2019/0007890 A1     Jan. 3, 2019

(51) Int. Cl.
*H04W 48/04*     (2009.01)
*B66B 1/34*     (2006.01)

(52) U.S. Cl.
CPC .......... *H04W 48/04* (2013.01); *B66B 1/3461* (2013.01); *B66B 2201/00* (2013.01); *B66B 2201/10* (2013.01); *B66B 2201/30* (2013.01)

(58) Field of Classification Search
CPC .. H04W 48/04; B66B 1/3461; B66B 2201/10; B66B 2201/30; B66B 2201/34
See application file for complete search history.

(56) References Cited

U.S. PATENT DOCUMENTS

| | | | |
|---|---|---|---|
| 5,032,989 A | 7/1991 | Tornetta | |
| 5,719,360 A * | 2/1998 | Davis | B66B 1/20 187/380 |
| 5,802,492 A | 9/1998 | DeLorme et al. | |
| 6,343,290 B1 | 1/2002 | Cossins et al. | |
| 7,737,837 B2 | 6/2010 | Donovan et al. | |
| 8,284,748 B2 | 10/2012 | Borghei | |
| 8,302,033 B2 | 10/2012 | Matas et al. | |
| 8,626,187 B2 | 1/2014 | Grosman et al. | |
| 8,676,273 B1 * | 3/2014 | Fujisaki | H04M 1/6505 455/567 |
| 8,700,060 B2 | 4/2014 | Huang | |
| 8,711,181 B1 | 4/2014 | Nourse et al. | |
| 8,896,629 B2 | 11/2014 | Meier et al. | |
| 8,941,489 B2 | 1/2015 | Sheshadri et al. | |
| 8,965,406 B2 | 2/2015 | Henderson | |

(Continued)

FOREIGN PATENT DOCUMENTS

| | | |
|---|---|---|
| KR | 101714527 B1 | 3/2017 |
| KR | 101698031 B1 | 5/2017 |
| WO | 2016100293 A1 | 6/2016 |

OTHER PUBLICATIONS

The Extended European Search Report for Application No. 18180985. 6; dated Nov. 19, 2018; dated Dec. 10, 2018; 8 pages.

*Primary Examiner* — Dominic E Rego
(74) *Attorney, Agent, or Firm* — Cantor Colburn LLP

(57) ABSTRACT

A method of establishing a range restriction for calling an elevator car through a mobile device is provided. The method comprising: displaying a map of a desired building on a manager device; adjusting the range restriction using the manager device, wherein the range restriction limits elevator calls to mobile devices located within a selected range of the desired building; receiving an elevator call from a mobile device, the elevator call including a geographical location of the mobile device; and moving the elevator car in response to the elevator call when the geographical location of the mobile device is within the range restriction limits.

20 Claims, 4 Drawing Sheets

(56) References Cited

U.S. PATENT DOCUMENTS

| | | |
|---|---|---|
| 9,141,640 B2 | 9/2015 | Tadman et al. |
| 9,215,560 B1 | 12/2015 | Jernigan |
| 9,280,559 B1 | 3/2016 | Jones |
| 9,319,837 B2 | 4/2016 | Josefiak et al. |
| 9,351,114 B2 | 5/2016 | Chatterjee et al. |
| 9,369,840 B2 | 6/2016 | Alsina et al. |
| 9,392,044 B2 | 7/2016 | Peterson |
| 9,411,967 B2 | 8/2016 | Parecki et al. |
| 9,560,481 B1 | 1/2017 | Yocam et al. |
| 9,602,970 B1 | 3/2017 | Mahapatra |
| 2008/0010013 A1* | 1/2008 | Rusanen ............... B66B 1/34 701/408 |
| 2013/0225196 A1 | 8/2013 | James et al. |
| 2013/0231137 A1 | 9/2013 | Hugie et al. |
| 2013/0310053 A1 | 11/2013 | Srivastava et al. |
| 2014/0188614 A1 | 7/2014 | Badenhop |
| 2015/0140994 A1 | 5/2015 | Partheesh et al. |
| 2015/0148060 A1 | 5/2015 | Parab et al. |
| 2015/0148061 A1 | 5/2015 | Koukoumidis et al. |
| 2015/0230054 A1 | 8/2015 | Myllymaki et al. |
| 2015/0346968 A1 | 12/2015 | Johnson et al. |
| 2016/0092470 A1* | 3/2016 | Chang ............... G09B 29/106 345/440 |
| 2016/0122156 A1* | 5/2016 | Kondo ............... B66B 5/0031 187/247 |
| 2016/0323439 A1* | 11/2016 | Tanabe ............... H04W 4/029 |
| 2017/0134894 A1 | 5/2017 | Simcik |
| 2017/0247223 A1* | 8/2017 | Piedra ............... B66B 1/30 |
| 2017/0283213 A1* | 10/2017 | Lotfi ............... B66B 1/3423 |
| 2017/0336210 A1* | 11/2017 | Rahman ............... G01C 21/206 |

\* cited by examiner

BUILDING ACCESS ZONE SPECIFICATION FOR MOBILE APPLICATIONS

BACKGROUND

The subject matter disclosed herein generally relates to the field of elevator systems, and more particularly to an apparatus and method for calling elevator cars within the elevator system.

Existing elevator systems allow a user to submit an elevator call (e.g., a hall call or a destination call) using their own mobile device (e.g., a smartphone). It is desired to place restrictions on a user's ability to call an elevator car remotely.

BRIEF SUMMARY

According to one embodiment, a method of establishing a range restriction for calling an elevator car through a mobile device is provided. The method comprising: displaying a map of a desired building on a manager device; adjusting the range restriction using the manager device, wherein the range restriction limits elevator calls to mobile devices located within a selected range of the desired building; receiving an elevator call from a mobile device, the elevator call including a geographical location of the mobile device; and moving the elevator car in response to the elevator call when the geographical location of the mobile device is within the range restriction limits.

In addition to one or more of the features described above, or as an alternative, further embodiments may include where prior to displaying a map, the method further comprises: receiving an identification of a desired building for a range restriction from a manager device, wherein the desired building includes at least one elevator car.

In addition to one or more of the features described above, or as an alternative, further embodiments may include where adjusting further comprises: displaying a standard range restriction on the map; and receiving a range restriction adjustment.

In addition to one or more of the features described above, or as an alternative, further embodiments may include where the receiving a range restriction adjustment further comprises: receiving at least one of a click input located on the range restriction on the map from a computer mouse and a touch input located on the range restriction on the map from a touchscreen; and receiving a drag and drop input on the range restriction from at least one of the computer mouse and the touchscreen.

In addition to one or more of the features described above, or as an alternative, further embodiments may include where the receiving a range restriction adjustment further comprises: receiving at least one of a type input of the range restriction from a computer keyboard and a click input located on a range restriction adjustment button on the map.

In addition to one or more of the features described above, or as an alternative, further embodiments may include where the desired building includes a center point that is displayed on the map and the range restriction limits elevator calls to mobile devices located within a selected range of the center point; and the center point is at least one of a geographical center point of the desired building, a front door of the desired building, and a lobby of the desired building.

In addition to one or more of the features described above, or as an alternative, further embodiments may include where adjusting further comprises: drawing a free-form range restriction on the map.

In addition to one or more of the features described above, or as an alternative, further embodiments may include where adjusting further comprises: receiving a type input of the range restriction from a computer keyboard; displaying a range restriction on the map; and receiving a range restriction adjustment.

In addition to one or more of the features described above, or as an alternative, further embodiments may include where the receiving a range restriction adjustment further comprises: receiving at least one of a click input located on the range restriction on the map from a computer mouse and a touch input located on the range restriction on the map from a touchscreen; and receiving a drag and drop input on the range restriction from at least one of the computer mouse and the touchscreen.

In addition to one or more of the features described above, or as an alternative, further embodiments may include where the receiving a range restriction adjustment further comprises: receiving at least one of a type input of the range restriction from a computer keyboard and a click input located on a range restriction adjustment button.

In addition to one or more of the features described above, or as an alternative, further embodiments may include adjusting the center point.

In addition to one or more of the features described above, or as an alternative, further embodiments may include where the adjusting the center point further comprises: receiving at least one of a click input located on the center point on the map from a computer mouse and a touch input located on the center point on the map from a touch screen; and receiving a drag and drop input on the center point from at least one of the computer mouse and the touch screen.

According to another embodiment, a computer program product tangibly embodied on a computer readable medium is provided. The computer program product including instructions that, when executed by a processor, cause the processor to perform operations comprising: displaying a map of a desired building on a manager device; adjusting the range restriction using the manager device, the range restriction limits elevator calls to mobile devices located within a selected range of the desired building; receiving an elevator call from a mobile device, the elevator call including a geographical location of the mobile device; and moving the elevator car in response to the elevator call when the geographical location of the mobile device is within the range restriction.

In addition to one or more of the features described above, or as an alternative, further embodiments may include where prior to displaying a map, the operations further comprise: receiving an identification of a desired building for a range restriction from a manager device, wherein the desired building includes at least one elevator car.

In addition to one or more of the features described above, or as an alternative, further embodiments may include where the adjusting further comprises: displaying a standard range restriction on the map; and receiving a range restriction adjustment.

In addition to one or more of the features described above, or as an alternative, further embodiments may include where the receiving a range restriction adjustment further comprises: receiving at least one of a click input located on the range restriction on the map from a computer mouse and a touch input located on the range restriction on the map from a touchscreen; and receiving a drag and drop input on the range restriction from at least one of the computer mouse and the touchscreen.

In addition to one or more of the features described above, or as an alternative, further embodiments may include where the receiving a range restriction adjustment further comprises: receiving at least one of a type input of the range restriction from a computer keyboard and a click input located on a range restriction adjustment button.

In addition to one or more of the features described above, or as an alternative, further embodiments may include where the desired building includes a center point that is displayed on the map and the range restriction limits elevator calls to mobile devices located within a selected range of the center point; and the center point is at least one of a geographical center point of the desired building, a front door of the desired building, and a lobby of the desired building.

In addition to one or more of the features described above, or as an alternative, further embodiments may include where the adjusting further comprises: drawing a free-form range restriction on the map.

In addition to one or more of the features described above, or as an alternative, further embodiments may include where adjusting further comprises: receiving a type input of the range restriction from a computer keyboard displaying a range restriction on the map; and receiving a range restriction adjustment.

Technical effects of embodiments of the present disclosure include the ability for a system manager to adjust a geographical range from which a mobile device can call an elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
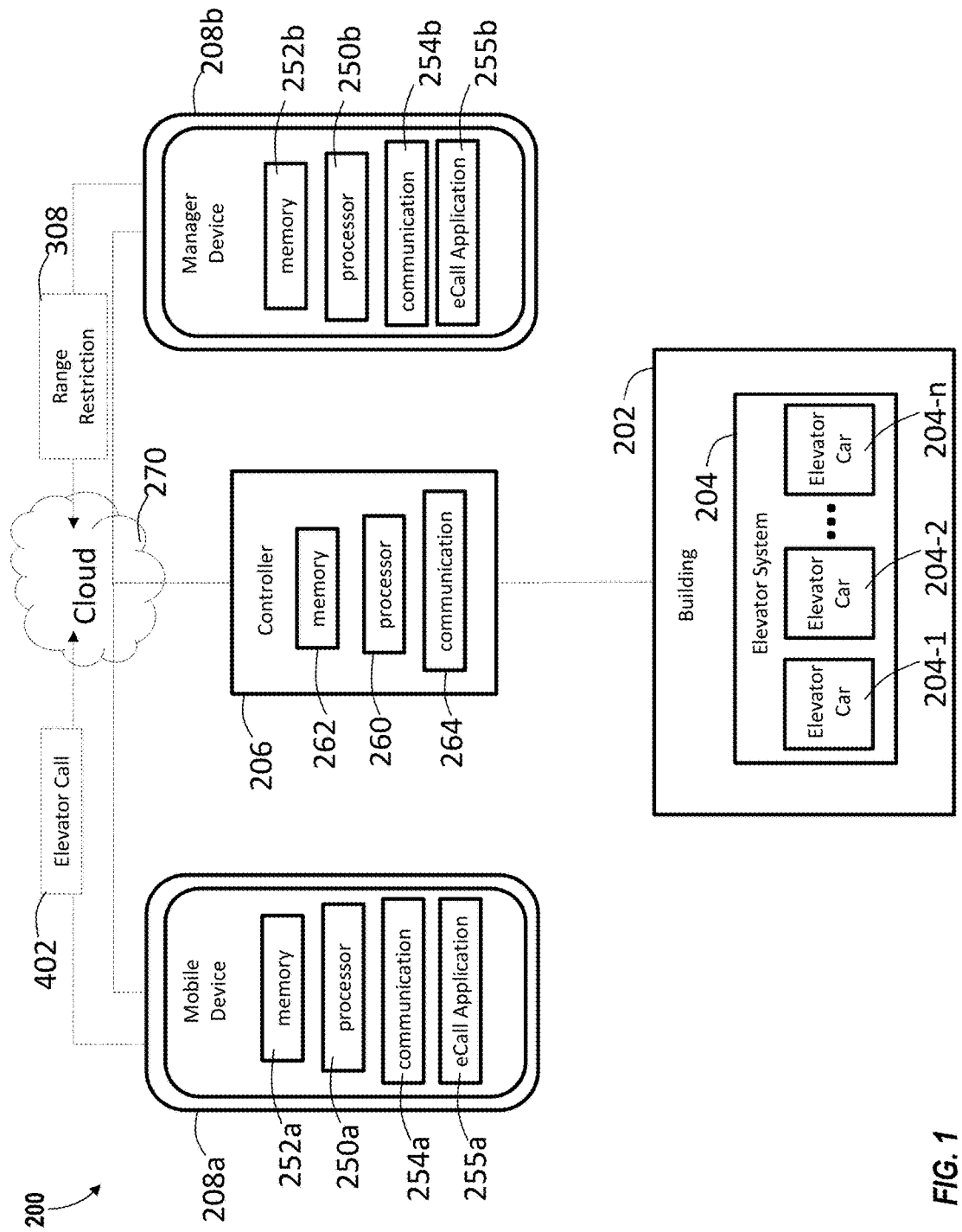
FIG. 1 illustrates a schematic view of an elevator call control system, in accordance with an embodiment of the disclosure.

FIG. 1 depicts an elevator call control system 200 in an example embodiment. The elevator call control system 200 includes an elevator system 204 installed at a building 202. The elevator call control system 200 may include other controlled systems, such as, for example, doors, lights, heating, cooling, window blinds, or any other system known to one of skill in the art. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator system 204.

The elevator system 204 may be operably connected to one or more computing devices, such as a controller 206. The controller 206 may be configured to control dispatching operations for one or more elevator cars (e.g., elevator cars 204-1, 204-2 ... 204-n) associated with the elevator system 204. The controller 206 may also be configured to control access to the one or more elevator cars (e.g., elevator cars 204-1, 204-2 ... 204-n) associated with the elevator system 204. It is understood that the elevator system 204 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 204. The elevator cars 204-1 and 204-2 may be located in the same hoistway or in different hoistways so as to allow coordination amongst elevator cars 204-1 and 204-2 in different elevator banks serving different floors. It is understood that other components of the elevator system 204 (e.g., drive, counterweight, safeties, etc.) are not depicted for ease of illustration.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

Also shown in FIG. 1 is a mobile device 208a. The mobile device 208a may be a mobile computing device that is typically carried by a person, such as, for example a smart phone, PDA, smart watch, tablet, laptop, etc. The mobile device 208a may include a touch screen (not shown). The mobile device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the mobile device 208a including executable instructions stored therein, for instance, as firmware. The communication module 254a may implement one or more communication protocols as described in further detail herein. The mobile device 208a belongs to a resident or employee of the building 202 who currently has access to the elevator system 204. Each mobile device 208a may transmit an elevator call 402 to the controller 206 and the controller 206 will move an elevator car in response to the elevator call 402. The mobile device 208a may transmit an elevator call 402 through an eCall application 255a. In an embodiment, there may be a range restriction 308 placed on elevator calls 402. The range restriction 308 is established via a manager device 208b discussed further below. The range restriction 308 places a restriction on the range (i.e. distance) a user may submit an elevator call 402. Advantageously, the range restriction 308 prevents elevator calls 402 from being submitted from mobile devices 208a not within the building.

Also shown in FIG. 1 is the manager device 208b. The manager device 208b may be a computing device such as a desktop computer. The manager device 208b may also be a mobile computing device that is typically carried by a person, such as, for example a phone, PDA, smart watch, tablet, laptop, etc. The manager device 208b may include a touch screen (not shown). The manager device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the manager device 208b including executable instructions stored therein, for instance, as firmware. The communication module 254b may implement one or more communication protocols as described in further detail herein. The manager device 208b may belong to a manager of the building 202. The manager device 208b may adjust a range restriction 308 through an eCall application 255b.

The mobile device 208a, the manager device 208b, and the controller 206 communicate with one another. The mobile device 208a, the manager device 208b, and the controller 206 may communicate over a wireless network, such as 802.11x (WiFi), short-range radio (Bluetooth), cellular, satellite, etc. In some embodiments, the controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the mobile device 208a and the manager device 208b using one or more communication protocols or standards. For example, the networked element may communicate with the mobile device 208a and the manager device 208b using near field communications (NFC). In other embodiments, the controller 206 may establish communication with a mobile device 208a and a manager device 208b that is outside of the building 202. This connection may be established with various technologies including GPS, triangulation, or signal strength detection, by way of non-limiting example. In example embodiments, the mobile device 208a and the manager device 208b communicate with the controller 206 over multiple independent wired and/or wireless networks. Embodiments are intended to cover a wide variety of types of communication between the mobile device 208a, the manager device 208b, and controller 206, and embodiments are not limited to the examples provided in this disclosure. Communication between the mobile device 208a and the controller 206 will allow the controller 206 to determine the location of the mobile device 208a in relation to the elevator system 204. Knowing the relative location of the mobile device 208a will allow the controller 206 to determine when the device 208 is within the range restriction 308 an elevator system 204 to request an elevator car.

Embodiments generate a graphical user interface on the mobile device 208a through an eCall application 255a. An eCall application 255b may also exist on the manager device 208b. In an embodiment, the eCall application 255b on the manager device 208b may be a manager portal through which a user of the manager device 208b may make changes to the eCall application 255b, such as, for example the range restriction 308. The eCall application 255b may be a software application and/or a web portal (website). The eCall application 255b may allow a manager to view/edit the current settings of the center point 306 and range restriction 308. The center point 306 and range restriction 308 are transferred from the web portal to a cloud server 270 and/or the controller 206 that is managing elevator calls 402.

The eCall application 255a may be used for users of the mobile device 208a to call an elevator car 204-1 of the elevator system 204 through an elevator call 402. The eCall application 255a may also be used to control other access controlled systems of the building 202, such as, for example, opening a door of the system, turning on a light, adjusting the heat, etc. The eCall application 255a sends its current location to the cloud server 270. The current location may be a GPS position or a location determined through near field communication with wireless signals, such as, for example, Bluetooth and WiFi. The cloud server 270 confirms that the mobile device 208a is within the range restriction 308 to call the elevator system 204. If this is true, then the elevator call 402 is transmitted to the elevator controller 206 that may be located in the building 206. Alternatively, the controller 206 may confirm that the mobile device 208 is within the range restriction 308 to call the elevator system 204.

Figure 2:
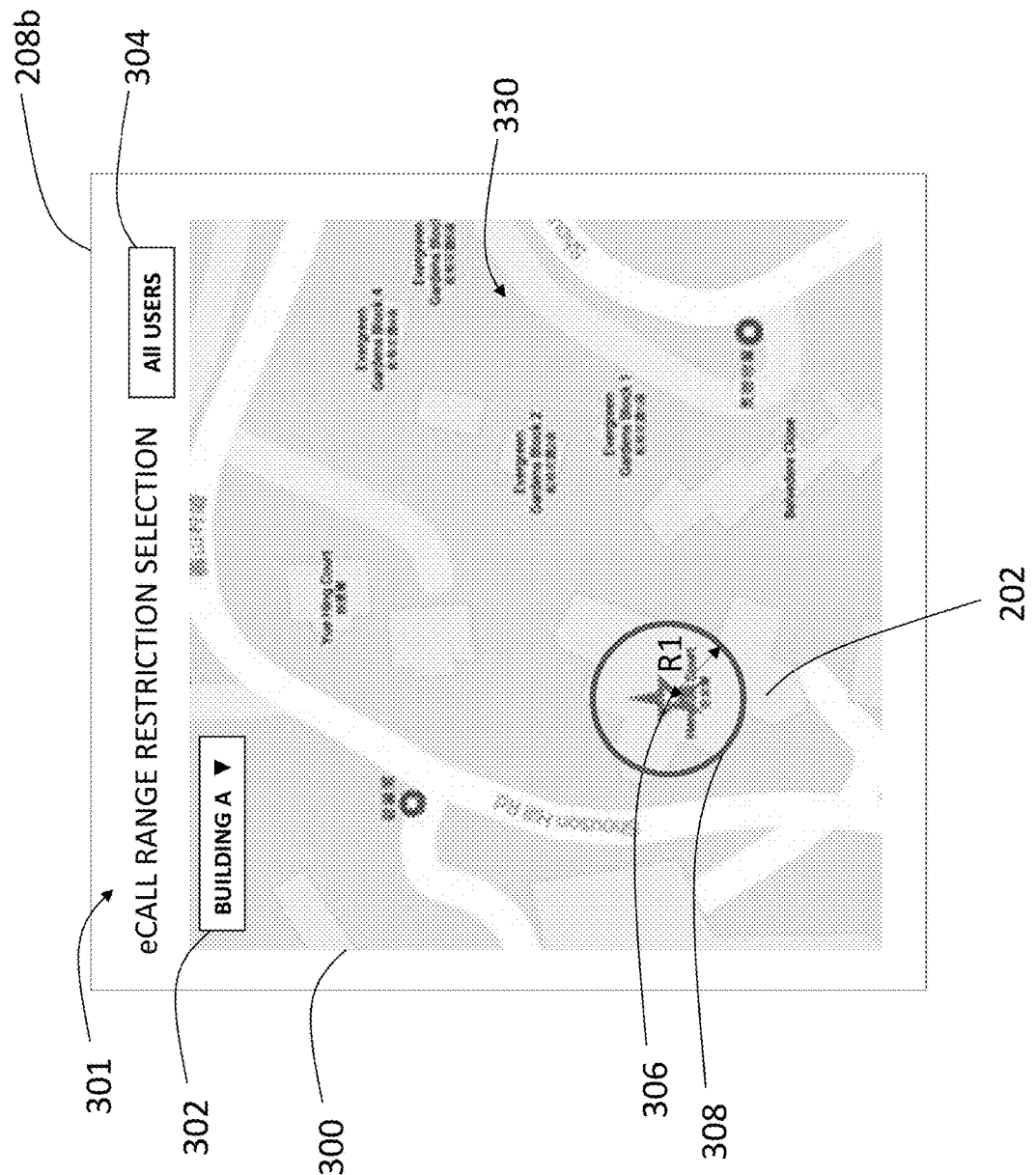
FIG. 2 depicts a graphical user interface on a manager device, in accordance with an embodiment of the disclosure.
Figure 3:
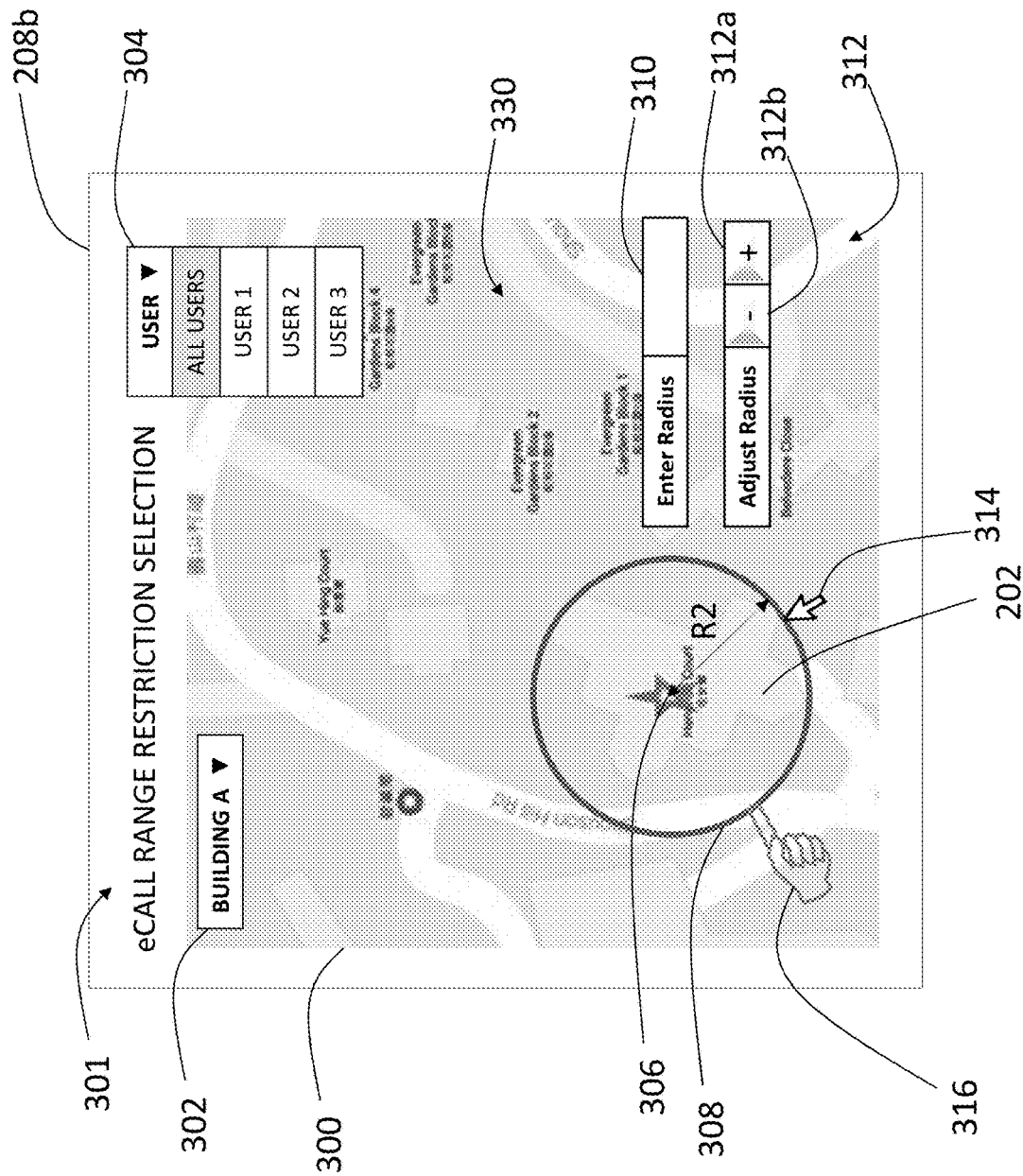
FIG. 3 depicts a graphical user interface on a manager device, in accordance with an embodiment of the disclosure.

FIGS. 2-3 depict an example graphical user interface 300 on the manager device 208b. Referring to FIG. 2, when the manager device 208b launches the eCall application 255b, an eCall range restriction selection screen 301 may be presented as shown in FIGS. 2 and 3. FIG. 2 displays a conventional user interface 300 for eCall Range Restriction selection 301. As shown in FIG. 2, once the desired building 202 is selected at box 302, the user interface 300 displays a map 330 with the desired building 202 marked by a center point 306 of the building 202. The center point 306 is at least one of a geographical center point of the desired building, a front door of the desired building, and a lobby of the desired building. The center point 306 may be automatically determined based on the geographical center latitude and longitude of the desired building 202 and/or chosen by the user of the manager device 208b. Once the center point 306 is determined, the range restriction 308 is automatically determined and displayed on the map 330 through the graphical user interface 300. A standard radius R1 is used to determine the range restriction 308. Currently the standard radius R1 is applied to every building regardless of size and/or shape of the building. As seen in FIG. 2, a standard radius R1 may leave some areas of the building 202 where a mobile dive 208a is unable to transmit an elevator call 402.

FIG. 3 displays a user interface 300 for eCall Range Restriction selection 301, according an embodiment of the present disclosure. As shown in FIG. 3, once the desired building 202 is selected at box 302, the user interface 300 displays a map 330 with the desired building 202 marked by a center point 306 of the building 202. The center point 306 is automatically determined based on the geographical center latitude and longitude of the desired building 202. In an embodiment, a user may move the center point 306 on map 330 using a computer mouse 314 or a human finger 316 if the manager device 208b includes a touch screen. Once the center point 306 is determined, the range restriction 308 is then established by the user of the manager device 208b and displayed on the map 330 through the graphical user interface 300. The range restriction 308 may also be a selected distance away from the desired building 202. There are multiple ways for a user of the manager device 208b to establish the range restriction 308 at a selected range R2. For example, a standard range restriction may be displayed initially on the map 330 and then user may adjust the range restriction 308. The user may adjust the range restriction 308 through typing the radius into box 310, adjusting the range restriction 308 by selected increments by clicking on adjustment buttons 312, click and dragging the range restriction 308 with a computer mouse 314, and/or touch and dragging the range restriction 308 with a human finger 316 on a touch screen. As seen in FIG. 3, the adjustment buttons 312 include a plus button 312a to increase the selected radius R2 of the range restriction 308 and a minus button 312 to decrease the selected radius R2 of the range restriction 308. As seen in FIG. 3, the user may adjust the range restriction 308 to ensure coverage for the entire building 202, such that, a mobile device 208a located within the building 202 may call an elevator car from anywhere inside the building 202. In another embodiment, the user may select at box 304, which mobile device 208a to apply the range restriction to 308. For instance, the range restriction 308 may be applied to only one mobile device 208a and/or all user devices 208a. It is understood that the range restriction 306 does not have to be circular but may also be adjusted by drawing a free-form range restriction on the map 330. For example, the range restriction may be drawn to match the shape of the desired building 202.

Figure 4:
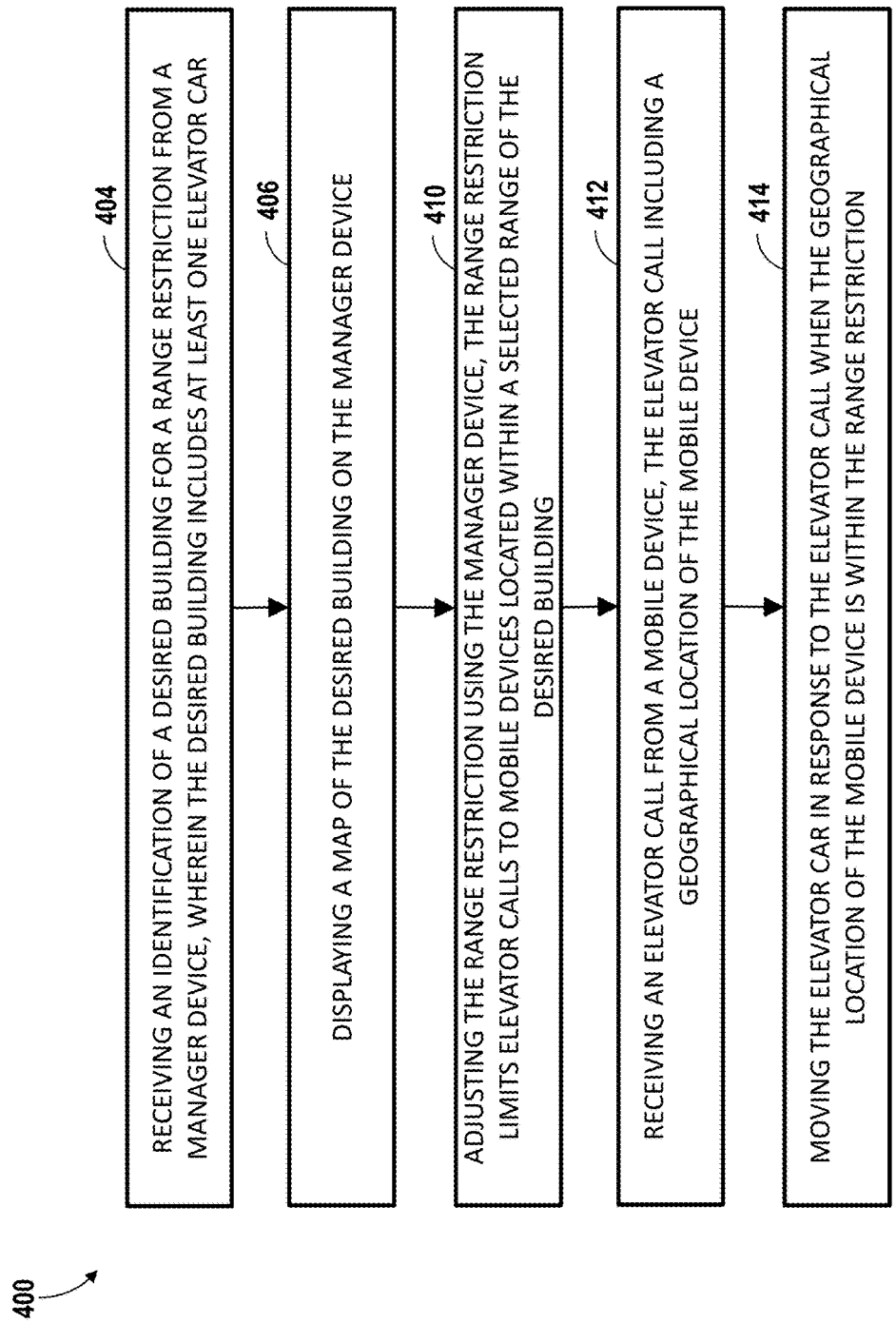
FIG. 4 is a flow diagram illustrating a method of establishing a range restriction for calling an elevator car through a mobile device, according to an embodiment of the present disclosure.

Referring now to FIG. 4, while referencing components of FIGS. 1-3. FIG. 4 shows a flow chart of method 400 of establishing a range restriction 308 for calling an elevator car 204-1 through a mobile device 208a, in accordance with an embodiment of the disclosure. At block 404, an identification of a desired building 202 for a range restriction 308 is received from a manager device 208b. As seen in FIGS. 2 and 3, the identification of the desired building 202 may be accomplished by selecting the desired building 202 via a drop down 302 (see. FIG. 2-3) or selecting the building on a screen on the manager device via a click input, a touch input, and/or an audible input at block 302. The identification is the user selecting the desired building 202 they wish to control the range restriction 308 on 302. The desired building 202 includes at least one elevator car 204-1. At block 406, a map 330 of the desired building 202 is displayed on the manager device 208b. In an example, the map 330 may be generated from Google Maps, Bing Maps, or any other map date provided publicly by the government for commercial use. The desired building 202 may have center point 306. The center point 306 of the desired building may be displayed on the map 330. The center point 306 may be automatically determined as the geographical center point and/or may be adjusted/selected by a user of the manager device 208b. The center point 306 may be adjusted by range restriction adjustment including at least one of a click input, touch input. The center point 306 may be adjusted by a click input located on the center point 306 on the map 330 from a computer mouse 314 and a drag and drop input on the center point 306 from the computer mouse 314. The center point 306 may also be adjusted by touch input located on the center point 306 on the map 330 from a touch screen by a human finger 316 and a drag and drop input on the center point 306 from the touchscreen by a human finger 316.

At block 410, the range restriction 308 is adjusted using the manager device 208b. As discussed above, the range restriction 308 limits elevator calls 402 to mobile devices 208a located within a selected range R2 of the desired building 202. In an embodiment, the range restriction 308 may limit elevator calls 402 to mobile devices 208a located within a selected range R2 of the center point 306 of the desired building 202. The range restriction 308 may be adjusted through the manager device 208b, as discussed above. The graphical user interface 300 may display a standard range restriction 308 on the map 330 to be adjusted later or an initial range restriction 308 may be entered into the manager device 208b through a typed input from a computer keyboard. The typed input may be entered at block 310, as seen in FIG. 3. The keyboard may be a touchscreen virtual keyboard or a physical keyboard. The range restriction 308 may be adjusted by a click input located on the range restriction 308 on the map 330 from a computer mouse 314 and a drag and drop input on the range restriction 308 from the computer mouse 314. The range restriction 308 may also be adjusted by a touch input located on the range restriction 308 on the map from a touchscreen by a human finger 316 and a drag and drop input on the range restriction 308 from the touchscreen by a human finger 316. The range restriction 308 may also be adjusted by a type input of the range restriction 308 from a computer keyboard at block 310 in FIG. 3. The range restriction 308 may be adjusted by a click input located on a range restriction adjustment button 312 on the map 330. The click input on the range restriction adjustment button 312 may be from a computer mouse 314 or a human finger 316 on a touch screen.

At block 412, an elevator call 402 is received from a mobile device 208a. The elevator call 402 including a geographical location of the mobile device 208a. At block 414, the elevator car 204-1 is moved in response to the elevator call 402 when the geographical location of the mobile device 208a is within the range restriction 308. For example, an elevator call 402 may be received from a mobile device 208a on the fifth floor of the building 202 within the range restriction 308, and thus an elevator car 204-1 will be sent to the fifth floor.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of establishing a range restriction for calling an elevator car through a mobile device, the method comprising:
    displaying a map of a desired building on a manager device;
    adjusting the range restriction using the manager device, wherein the range restriction limits elevator calls to mobile devices located within a selected range of the desired building;
    receiving an elevator call from a mobile device, the elevator call including a geographical location of the mobile device; and
    moving the elevator car in response to the elevator call when the geographical location of the mobile device is within the range restriction limits.

2. The method of claim 1, wherein prior to displaying a map, the method further comprises:
    receiving an identification of a desired building for a range restriction from a manager device, wherein the desired building includes at least one elevator car.

3. The method of claim 1, wherein adjusting further comprises:
    displaying a standard range restriction on the map; and
    receiving a range restriction adjustment.

4. The method of claim 3, wherein the receiving a range restriction adjustment further comprises:
    receiving at least one of a click input located on the range restriction on the map from a computer mouse and a touch input located on the range restriction on the map from a touchscreen; and
    receiving a drag and drop input on the range restriction from at least one of the computer mouse and the touchscreen.

5. The method of claim 3, wherein the receiving a range restriction adjustment further comprises:
    receiving at least one of a type input of the range restriction from a computer keyboard and a click input located on a range restriction adjustment button on the map.

6. The method of claim 1, wherein:
    the desired building includes a center point that is displayed on the map and the range restriction limits elevator calls to mobile devices located within a selected range of the center point; and
    the center point is at least one of a geographical center point of the desired building, a front door of the desired building, and a lobby of the desired building.

7. The method of claim 6, further comprising:
    adjusting the center point.

8. The method of claim 7, wherein the adjusting the center point further comprises:
    receiving at least one of a click input located on the center point on the map from a computer mouse and a touch input located on the center point on the map from a touch screen; and
    receiving a drag and drop input on the center point from at least one of the computer mouse and the touch screen.

9. The method of claim 1, wherein adjusting further comprises:
    drawing a free-form range restriction on the map.

10. The method of claim 1, wherein adjusting further comprises:
    receiving a type input of the range restriction from a computer keyboard;
    displaying a range restriction on the map; and
    receiving a range restriction adjustment.

11. The method of claim 10, wherein the receiving a range restriction adjustment further comprises:
    receiving at least one of a click input located on the range restriction on the map from a computer mouse and a touch input located on the range restriction on the map from a touchscreen; and
    receiving a drag and drop input on the range restriction from at least one of the computer mouse and the touchscreen.

12. The method of claim 10, wherein the receiving a range restriction adjustment further comprises:
    receiving at least one of a type input of the range restriction from a computer keyboard and a click input located on a range restriction adjustment button.

13. A computer program product tangibly embodied on a non-transitory computer readable medium, the computer program product including instructions that, when executed by a processor, cause the processor to perform operations comprising:
    displaying a map of a desired building on a manager device;
    adjusting the range restriction using the manager device, the range restriction limits elevator calls to mobile devices located within a selected range of the desired building;
    receiving an elevator call from a mobile device, the elevator call including a geographical location of the mobile device; and
    moving the elevator car in response to the elevator call when the geographical location of the mobile device is within the range restriction.

14. The computer program of claim 13, wherein prior to displaying a map, the operations further comprise:
    receiving an identification of a desired building for a range restriction from a manager device, wherein the desired building includes at least one elevator car.

15. The computer program of claim 13, wherein the adjusting further comprises:
    displaying a standard range restriction on the map; and
    receiving a range restriction adjustment.

16. The computer program of claim 15, wherein the receiving a range restriction adjustment further comprises:

receiving at least one of a click input located on the range restriction on the map from a computer mouse and a touch input located on the range restriction on the map from a touchscreen; and receiving a drag and drop input on the range restriction from at least one of the computer mouse and the touchscreen.

17. The computer program of claim 15, wherein the receiving a range restriction adjustment further comprises:

receiving at least one of a type input of the range restriction from a computer keyboard and a click input located on a range restriction adjustment button.

18. The computer program of claim 13, wherein:

the desired building includes a center point that is displayed on the map and the range restriction limits elevator calls to mobile devices located within a selected range of the center point; and the center point is at least one of a geographical center point of the desired building, a front door of the desired building, and a lobby of the desired building.

19. The computer program of claim 13, wherein the adjusting further comprises:

drawing a free-form range restriction on the map.

20. The computer program of claim 13, wherein the adjusting further comprises:

receiving a type input of the range restriction from a computer keyboard;

displaying a range restriction on the map; and receiving a range restriction adjustment.

* * * * *